April 22, 1969     E. L. ROGERS     3,439,524
AUTOMATIC WEIGHING SCALE CALIBRATION
Filed April 27, 1966
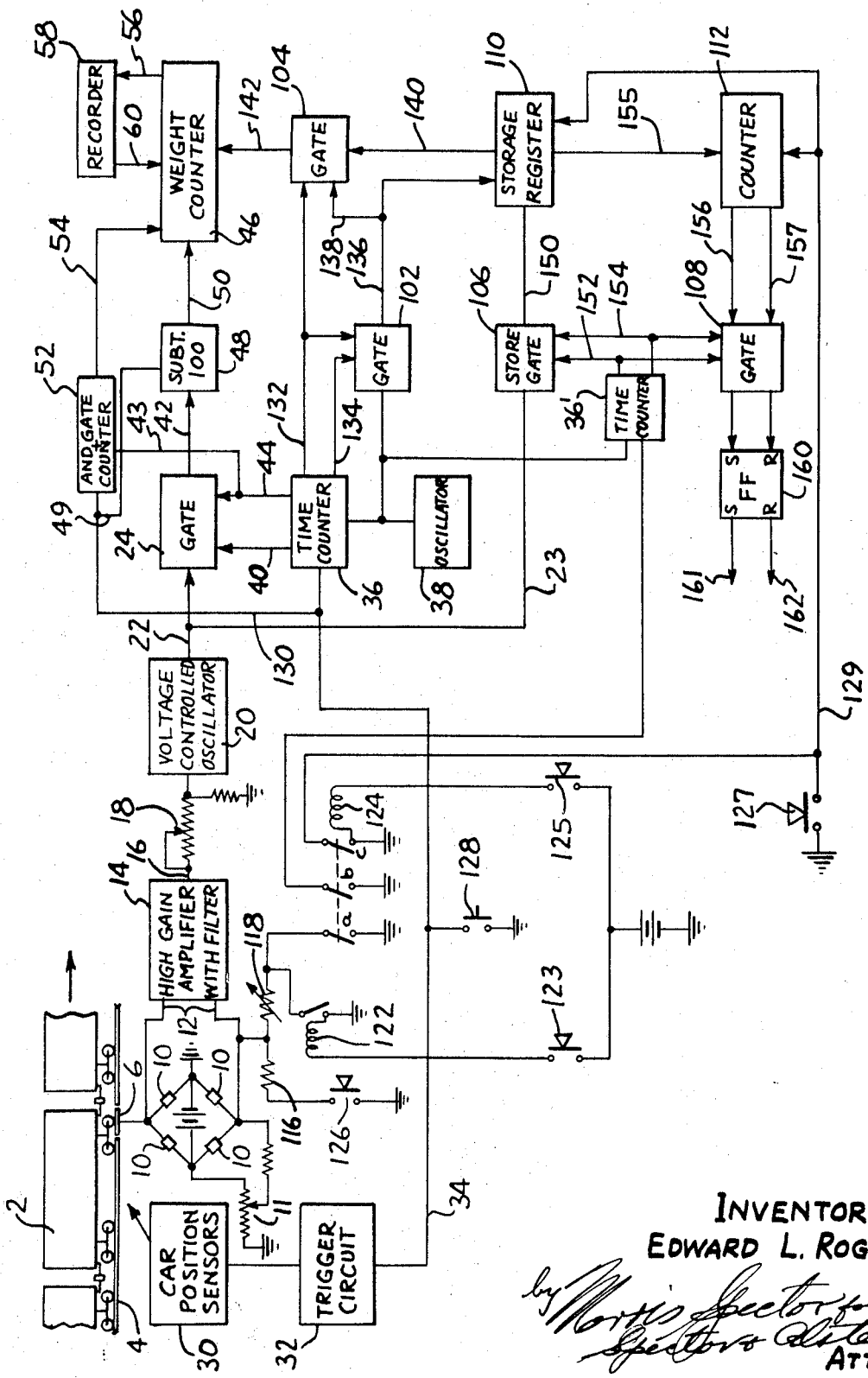
INVENTOR
EDWARD L. ROGERS
ATTYS.

United States Patent Office 3,439,524
Patented Apr. 22, 1969

3,439,524
AUTOMATIC WEIGHING SCALE CALIBRATION
Edward Laurence Rogers, Park Ridge, Ill., assignor to Railroad Machinery Development Corporation, Northfield, Ill., a corporation of Ohio
Filed Apr. 27, 1966, Ser. No. 545,635
Int. Cl. G01g 19/04
U.S. Cl. 73—1
9 Claims

ABSTRACT OF THE DISCLOSURE

A scale for weighing railroad cars in motion including means by which an operator may check weighing scale to determine the drift of the indicator, if any, at a predetermined simulated load. Means are provided for storing the drift information and automatically applying an appropriate correction to subsequent weight recordings. An alarm is built in to indicate that the drift has exceeded the predetermined amount considered allowable.

This invention relates to improvements in electronic measuring apparatus, particularly such apparatus as produces its manifestation in digital form, and it is concerned with the calibration of such apparatus to compensate, or partially compensate, for error-producing changes that take place in the apparatus from time to time. Such error-producing changes may be due to variations in temperature or ambient pressure, changes in the components due to aging or previous vibrations of the measuring equipment, and many other causes.

It is one object of this invention to provide a measuring apparatus which can ascertain its own error in measurement and make an appropriate correction in its indication or print-out of the measurements made.

It is a further object of this invention to provide for determining whether the required error-compensating correction exceeds predetermined limits, and indicating such fact when it exists.

It is a still further object of this invention to provide an apparatus of the above character with contained recalibrating components which, when fully connected in the circuit, produce electrical effects upon the equipment equivalent to the effects produced by the sensing portion of the apparatus in response to a known force to be measured. The recalibrating components may therefore be temporarily connected in the circuit to recalibrate the equipment, when desired, in lieu of using extraneous standard force-producing means for that purpose.

This invention is applicable to weighing or force-measuring operations in general, such as systems for measuring pressure, heat, fluid flow, speed, or making any other measurement that can be ascertained by a transducer and ultimately manifested in digital form. For this purpose, a transducer may be defined as a device for determining the magnitude of a condition by converting it into a proportionate measurable electrical function.

The attainment of the above and further objects of this invention will be apparent from the following specification taken in conjunction with the accompanying drawing forming a part thereof.

In the drawing, the single figure is a schematic diagram of one embodiment of the present invention.

The system of FIG. 1 illustrates the present invention as applied to an electrical scale of the type used for weighing railroad freight cars of a train of cars coupled together and in motion. The system is one such as shown in my pending application Ser. No. 500,982, filed Oct. 22, 1965, which is, in turn, a division of my application Ser. No. 365,470, filed May 6, 1964 and now abandoned, the details of which are incorporated herein by reference.

Railroad freight cars 2 of a train of coupled cars moving in the direction indicated by the arrow pass over a weighrail section of station 6. The railroad track, of course, consists of two parallel rails, only one of which has been illustrated. The weigh section 6 is separated at its two ends from the adjacent track portions and is of such a length that each of the respective components of the railroad freight car to be weighed (where the car is weighed in parts) is at some time alone and fully scale-borne. Where the weighing is to be done while the train is in motion, the weigh section 6 is of a length sufficient to permit the weighing operation to be started and completed during the time that the being-weighed component of the freight car is still on the scale. In case of a scale used for weighing each truck of the car as a component and then adding the two truck weights together, the weigh section is generally of a length of the order of 12½ feet. In a scale where the weight carried by the individual axles is weighed, as is herein illustrated, the weigh section is of a length generally about 5 feet 3 inches.

The weigh section is supported generally by four load cells 10, one at each corner of a frame that supports the rails of the weigh section 6. A load cell may be defined as a device for converting a condition into a proportionate voltage. Specifically, a load cell is a type of transducer that changes the force representing the weight of an object into a voltage whose magnitude varies directly as the applied weigh or force. Many well-known circuits for accomplishing this purpose may be used. One standard circuit is a Wheatstone bridge shown. The bridge includes a potentiometer for adjusting the arms of the bridge to adjust the "zero" setting of the scale. The voltage at the output 12 is fed to a high-gain amplifier and low-pass filter combination 14. The output of the amplifier-filter appearing on the output conductor 16 is a function of (directly proportional to) the weight to be measured. This output voltage is applied through a potentiometer 18 to a voltage-controlled oscillator 20 that produces a variable frequency appearing at output conductor 22. The frequency at 22 is instantaneously proportional to the voltvoltage at the input of oscillator 20. Such oscillators are well known, see for instance United States Patents 2,672,284 or 2,835,868. The pulses of oscillator 20 are supplied to gates 24 and 106, as will be more fully explained.

Car position sensors 30 are provided for determining when a component to be weighed reaches a position where it is fully and alone on the weigh section 6, whereupon a trigger circuit 32 operates to place a pulse on conductor 34, thereby resetting to zero (or starting) a timer counter 36. The timer counter 36 counts pulses received by it from a standard frequency oscillator 38 which produces oscillations at an accurately fixed frequency, for instance 100,000 cycles per second. Upon completion of a fixed count, representing a fixed time for which the counter 36 has been set, for instance 0.5 seconds, it sends an opening pulse over conductor 40 which causes the gate 24 to open and permit pulses from the conductor 22 to pass through the gate 24 and appear at conductor 42. At a fixed period of time thereafter, in this instance 0.2 seconds, the counter 36 places a pulse on close conductor 44 that closes the gate 24, thus stopping the passage of pulses therethrough. The pulses appearing on the conductor 42 are to be counted by a counter 46, but first a fixed number of pulses on the conductor 42 are subtracted. Subtracting counter 48 counts 100 pulses and then establishes a connection from the conductor 42 to conductor 50 that goes to the weight counter which counts the pulses that follow. Every time that a pulse is sent over the trigger circuit 34 to the counter 36, it is also sent to the counter 48 over conductor 49. The above description, except for the subtraction counter 100, is the system of my above applications previously described, the specification of which is herein incorporated by reference. The purpose of the subtraction counter will be pointed out as this description proceeds.

The equipment also includes four additional gates here called complementary gate 102, correction gate 104, storage gate 106, and range-detection gate 108. It also includes a storage register 110 which has a counter that counts pulses from 1–199 and if the pulses continue, it merely spills over and repeats over and over again as many times as pulses continue to be received, and on each spill-over it sends an impulse to a counter 112.

There is also provided an initial calibrating resistance 116, and a resistance 118 for automatically correcting errors that arise in the system after calibration. The resistance 118 is a variable resistance that can readily be set to a desired value. Relays 122 and 124 controlled by manual switches 123 and 125 respectively, are also provided. Also, there are manual grounding switches 126, 127 and 128. All of the manual switches open when released.

INITIAL CALIBRATION

Assume first that the system has just been installed and requires its initial calibration. A standard known weight is placed on the weigh rail, say, a weight of 40,000 pounds, which is in the vicinity of most of the weighings that are to be made. The switch 127 is momentarily closed placing ground on conductor 129 to return the register 110 to its initial or zero position. Thereafter, switch 128 is closed. Ground thus placed on conductor 34 resets counter 36 to its initial or zero position. That counter now proceeds to count pulses received from the standard oscillator 38. This ground also resets the subtracting counter 48. After counter 36 has counted 40,000 pulses, which is 0.4 seconds, it places a pulse on conductor 132 which opens the gates 102 and 104. 0.1 of a second later, it places a pulse on conductor 134 that closes gate 102. During the intervening 0.1 of a second, while the gate 102 was open, pulses from the oscillator 38 passed through the open gate 102 to the conductor 136 to the storing register 110 and over conductor 138, through the gate 104 and conductor 142 to the weight counter 46. When the storing register 110 has made its first revolution, i.e. received 200 pulses, it sends a pulse over closing conductor 140 to close the gate 104 stopping the passage of pulses over 142 to the weight counter. The weight counter received a total of 200 pulses during this 0.1 of a second. 0.5 of a second after closure of the switch 128, the counter has also placed an opening pulse on conductor 40 which opens the weigh gate 24. Thereafter, 0.2 of a second later, the counter 36 places a closing pulse on the closing conductor 44 and closes the gate 24. While the gate 24 was open, the oscillator 20 was transmitting pulses over the conductor 22, through the gate 24, to the conductor 42 at a rate that was determined by the standard weight then on the scale, which was 40,000 lbs. The subtracting circuit 48 subtracts the first 100 impulses received over the conductor 42 and transmits the remaining pulses to the weight counter 46. Since the weight counter 46 already had in it a count of 200, as previously explained, the weight counter now will show a count that is 100 in excess of the number of pulses transmitted by the oscillator 20 through the conductor 42. Assume now that the operator wishes a scale calibration wherein each pulse will represent 10 pounds. He therefore wants the weight counter to read 4,100 during this calibration, which means that 4,000 pulses are to be transmitted by the oscillator 20 during the 0.2 of a second. The operator therefore adjusts the poentiometer 18 to increase or decrease the voltage supplied to the oscillator 20, depending upon whether the previous reading of the counter 46 was less or more than 4,100. After each adjustment of the potentiometer, the operator repeats the closing of the switch 128, which causes a repeat reading by the counter 46. This is repeated until the weight counter indicates 4,100, which is a count of 100 more than the count produced by the known standard calibrating weight. The potentiometer 18 is now in adjustment. The operator then causes removal of the calibrated weight from the rail. He then momentarily closes the switch 126. This places an artificial potential at the output side of the load cells that produces an effect on the system, the same as if some weight were on the weigh rail. The operator then reads the artificial weight thus indicated and makes a permanent record of that weight, which he may call a standard calibrating weight for that scale, and indicates that weight on the data sheets belonging to that scale. The resistance 116 is so chosen that the calibrating weight will be close to the range of 4,000 counts. This data is to be used only where the scale requires recalibration of a major magnitude.

The operator then momentarily closes the manual switch 123, which operates the relay 122, to connect the variable resistance 118 in the circuit in the same manner that the resistance 116 was previously connected, and the operator again takes the reading by the weight counter. The resistance 118 is manually adjustable and it is adjusted so that the reading thus obtained is 4,200 counts, or the equivalent of 42,000 pounds. The number 4,200 is chosen as follows: the number 4,000 represents the number of counts of the weights within the range in which the scale will primarily be used. The number 200 is a whole sub-multiple of 1,000 and is in excess of twice the greatest error that is to be subject to automatic correction during the use of the scale. The actual number of pulses generated when the resistance 118 is used in lieu of a calibrating weight is 4,100 because we have added 200 pulses through the gate 104 and subtracted 100 pulses at the subtractor 48. This completes the initial scale calibration.

During the normal operation of the equipment, after the initial calibration thereof, the switches 123, 126, 127 and 128 remain open and are not used.

OPERATION-CHECKING CALIBRATION DRIFT

An explanation will now be given of the manner of operation of the scale preparatory to weighing railroad freight cars coupled and in motion. To check the calibration drift the operator momentarily actuates the push-button switch 125, which energizes the relay 124. This relay will remain closed for at least 0.7 of a second. The relay 124 closes its contacts a, b, and c. Ground on contact a produces voltage on conductor 12 through the load cell bridge circuit and thus producing pulses at the output side of the oscillator 20, as heretofore explained. Ground on the contact b restores a counter 36' to zero. This counter receives and counts pulses from the oscillators 38. Ground on contact c through conductor 129 restores the register 110 to its zero position. All this is before a freight car has reached the weighrail and the trigger circuit 34 is not grounded. When counter 36' has counted for 0.5 seconds (50,000 pulses) it places a pulse on opening conductor 152. It places a pulse on closing conductor 154 0.2 of a second thereafter. During this intervening 0.2 of a second the gates 106 and 108 are open. The gate 106 therefore permits pulses from the conductor 23 to pass therethrough to the conductor 150 and the storage register 110. When the gate 106 closes, 0.2 second later, it stops the flow of pulses over the conductor 150. During that interval, if the calibration of the scale has remained as originally set, 4,100 counts should have passed through the register 110. Since this register counts up to 199 and then spills over and repeats, it will have spilled over twenty times and come to rest at count 100. Each time it spilled over, it sent a pulse over conductor 155 to counter 112. Counter 112 should therefore have come to rest at a count of 20. When the counter 112 changes from zero to 1, it sends a pulse over the "set" conductor 156 through the then open gate 108 to a flip-flop 160. Thereafter, the flip-flop remains set until the counter 112 goes from 19 back to zero, which happens at the count from 19 to 0. As the counter moves from 19 to 0, it issues a reset pulse over conductor 157 that goes through the gate 108 to reset the flip-flop 160. When the flip-flop is in the set position, it issues a danger signal over conductor 161. When it is in the reset position, it issues a "clear" signal over conductor 162. As the counter passes from 0 to 1, it places the flip-flop in its set position. It returns it to the reset position when it goes from 19 back to zero, and then again places it in set position when it goes from zero to 1. It therefore follows that the flip-flop will be in its reset position only when the counter 112 is on zero, which is the position it can be in only during the first 200 counts of each 4,000 counts delivered to the register 110. At all other counts, it indicates danger.

WEIGHING

Assume now that the equipment is in the balance to which it was set on its original calibration and there were no extraneous error-producing changes. This calibration therefore causes the register 110 to receive 4,100 counts. It came to rest with 100 counts stored therein, and the counter 112 received 20 counts and came to rest at zero. A moment later, the relay 124 is released. The scale is now ready to begin weighing of the actual load. As a train then moves onto the weigh section 6 it causes the load cells 10 to produce a voltage which is during each instant proportionate to the instantaneous force exerted thereagainst. When the car position sensors 30 indicate that a car component that is to be weighed is fully and alone on the weigh rail, the trigger circuit 32 is actuated to place a pulse on the conductor 34. This pulse resets the counter 36 to zero and causes that counter to commerce to count pulses as a measure of time. When it has counted a number of pulses equal to 0.4 seconds, or 40,000 pulses, it places an opening pulse on conductor 132 which opens the gates 102 and 104. 0.1 of a second later, it places a closing pulse on conductor 134 which closes the complementary gate 102 but does not close the gate 104. During the time that the gate 102 was open, the oscillator 38 was sending pulses through that gate to the conductor 136 at the rate of 100,000 per second, or 10,000 pulses. These pulses went into the storage register 110 and started that register counting from the position in which it was previously left, namely 100. At the same time, pulses from the conductor 136 were going into the now open gate 104, and the conductor 142, to the weight counter 46. When the 100th pulse goes over the conductor 136, the counter 110 passes from its 199 position to its 0 position (it started from 100) and sends a pulse over the stop conductor 140 to close the gate 104 so that no more pulses can travel via the conductor 136 to 142 and the counter 46. As a result, 100 pulses have been sent to the weight counter 46 during the time that the gates 102 and 104 were open. After the counter 36 has been counting for 0.5 seconds, it sends a closing pulse over the conductor 134 to close the complementary gate 102 to stop counting at the storage register 110. All of the 10,000 pulses generated during the 0.1 second that the gate 102 was open pass through the register 110, added to the initial setting of that register. Since that register starts over again once each 200 pulses received, it will make 50 complete turns and end up at its initial setting, at the end of the 0.5 seconds. At the 0.5 second time the counter 36 sends an opening pulse over conductor 40 to open the gate 24. The gate 24 remains open until the counter 36 issues a closing pulse over conductor 44 to close that gate. This closing pulse is issued 0.2 seconds after the opening pulse went over the conductor 40. The gate 24 therefore remains open from 0.5 seconds after the pulse went out over conductor 34 to 0.7 seconds after that pulse went out, or an open time of 0.2 seconds. During that open time, the oscillator 20 is delivering pulses on conductor 22 at a frequency proportionate to the instantaneous weight on the weigh section. These pulses pass through the gate 24 to the subtracting unit 48. This counts the first 100 pulses and then stops counting and establishes a circuit through itself from conductor 42 to conductor 50. The subsequent pulses go via the conductor 50 to the weight counter 46, where they are counted. Since the weight counter already has an initial count of 100, that compensates for the subtraction of 100 pulses by the substraction counter 48. When the gate 24 is closed, further counting due to instantaneous weight on the weighrail ceases. The next time a pulse comes from the trigger circuit 32 over the conductor 34 to set the counter 36, it also resets the subtracting counter 48 so that it will again be operative to postpone the passage of pulses from 42 to 50 until 100 pulses have been counted by the subtracting counter 48.

When the second, third and fourth wheels of the freight car 2 come into weighing position and each is weighed in the manner previously prescribed, namely when the second axle reaches a position over the weigh rail and the sensor 30 is actuated, another 100 pulses are delivered to counter 46 via the gate 104 and later 100 pulses are subtracted by subtracting counter 48 from the weight indication of axle 2. This is repeated for axles 3 and 4, the weight counter 46 giving the cumulative count.

Each time that the trigger circuit 32 operates to start the clock counter 36, it also sends a pulse over conductor 130 and the unit 52 and via the conductor 49 to the subtracting counter 48. The unit 52 is a unit that is set to count any given number of pulses, in this instance four. On every fourth pulse, this unit is in a position to transmit a pulse over the conductor 54. It transmits such a pulse through the control of an "And" gate incorporated therein that becomes effective upon the concurrence of a fourth pulse over the conductor 170 and a stop pulse over the conductor 44 via conductor 43. When this "and" condition exists, a pulse is sent over the conductor 54 which directs the weight counter 46 to transmit its contained count over the conductor 56 to a print-out recorder 58 that prints out the counts, in this instance multiplied by ten, to indicate the total weight. When it has done so, the recorder sends a pulse over the conductor 60 to the weight counter 46 to restore it to its zero position.

When the next or some other train of cars is to be weighed, the weighmaster may again momentarily close the circuit for operating the relay 124. At relay contact $c$ ground is placed via conductor 129 on the counter 112 and the storage register 110, restoring them to zero. The contact $a$ connects the resistance 118 in the circuit in lieu of a weight on the weigh rail 6. Assume now that at this time error-producing changes have occurred in the equipment so that the resistance 118, which should produce a count of 4,100, produces a different count, the difference being a plus or minus $e$ where $e$ is the error. Assume further that the error is less than 100 counts, or less than the equivalent of 1,000 pounds. Here again, as soon as the contact $b$ closes, the time counter 36′ counts time by counting oscillations of the oscillator 38 until 0.5 seconds have passed, and then opens the storage gate 106 and leaves it open for 0.2 seconds. During those 0.2 seconds, pulses pass from the conductor 22 through the storage gate to the storing register. The total number of pulses will be 4,100 plus or minus the error, which we will call $e$ counts. Since the error is assumed to be less than 100 counts, the remaining number stored in the register 110 after it has spilled over twenty times, will be 100 plus or minus $e$. Thereafter, when the axles of a moving freight car to be weighed pass over the weigh section, the operation will be as before, but the number of counts that are delivered to the weight counter from the storage register 110 via the gate 104 will be 100 minus or plus $e$ and later when the weight induced pulses pass via the conductor 22 through the gate 24, and 100 is subtracted from the number of pulses and delivered via the conductor 50 to the weight counter 46, the weight counter will already have on it the number of pulses that had been delivered over the conductor 142. This presetting of the counter 46 is 100 minus or plus the *e* pulses, the number of *e* pulses being additive when the error is one of underweight, and subtractive when the error is one of overweight.

The danger-indicating signal from the conductor 161 of the flip-flop may be used to print an error signal upon the tape of the recorder each time that the recorder operates under conditions of danger, said printed error signal being located on the tape at the place where the weight recording for the particular weight is then being recorded. This thereby indicates at which one of the series of objects being weighed the error occurred. That time signal may also be used to cause any other print-out that designates danger or uncorrected excessive error.

The filter in the high-gain amplifier 14 attenuates the error-producing effects of vibration induced by the movement of the wheels over the weigh rail. The errors above 10 or 15 cycles per second would be averaged out and reduced substantially to zero by the integration over a period of 0.2 seconds. However, the lower frequency error-producing vibrations might not be thus eliminated. These lower frequency vibration-induced errors are, however, reduced substantially to zero by the filter and by the delay of time of 0.5 seconds, as heretofore explained.

The drift calibration correcting operation via the resistor 118 takes into account the entire electronic measuring system, including the load cells 10 and the source of voltage for the bridge of the load cells. It therefore detects drift from proper calibration in the entire system.

What is considered new is:

1. Measuring means including a transducer whose output is an electrical phenomenon of a magnitude which is a function of a quantity to be measured, apparatus converting the output into digital form and of a predetermined calibration, in combination with detection means for determining and storing the digital magnitude of the drift of the calibration of the measuring means when measuring a known amount of the quantity to be measured, and correcting means for correcting each subsequent operation of the apparatus to compensate for the drift as determined by the drift detection means.

2. The combination of claim 1 wherein the drift correcting means includes means for algebraically adding the amount of the drift, if any, to the digital value of the output of the transducer as determined by said apparatus.

3. The combination of claim 1 wherein the means for correcting each subsequent converted output includes means for imposing a setting on the apparatus which is a function of the digital value of the drift so that upon operation of the apparatus to convert the transducer output to digital form the effect of the drift is included in the final digital value of the apparatus.

4. The combination as set forth in claim 1 having means for delaying the conversion of the transducer output for a time interval after actuation of the transducer, and means effective during said time interval for actuating the apparatus to introduce thereinto the correction determined by the stored digital magnitude of the drift.

5. The combination as set forth in claim 1 having means for initiating a cycle that includes actuation of the drift detection means and upon each subsequent actuation of the apparatus combining the digital values of the outputs of the drift detecting means and the apparatus.

6. Measuring apparatus of claim 2 wherein there is provided means for delaying the measurement of the transducer output for a time interval after the to-be-measured factors have been applied to the transducer, and means for causing the aforesaid algebraic addition to take place during said time interval.

7. Measuring means including a transducer, the output of which is an electrical phenomenon of a magnitude which is a function of a quantity to be measured, apparatus converting the output into digital form and of a predetermined calibration, in combination with detection means for determining the digital magnitude of the drift of the calibration of the measuring means at a known input into the transducer, and means for algebraically adding the amount of drift, if any, to the digital value of the output of the transducer as determined by said apparatus.

8. Measuring apparatus of claim 7 wherein there is provided means for delaying the measurement of the transducer output for a time interval after the to-be-measured factors have been applied to the transducer, and means for causing the aforesaid algebraic addition to take place during said time interval.

9. In a system wherein successive railroad cars of a series are weighed as they move through a weighing station that includes weighing apparatus and a recorder for recording the weights of the successive cars of the series, the method which comprises testing to determine the drift of the calibration of the weighing apparatus while the cars are in motion, delaying the weighing of each car at the weighing station for a fraction of a second after the car is in weighing position to facilitate attenuation of motion-induced vibrations, and making calibration drift correction during that fraction of a second.

References Cited

UNITED STATES PATENTS

| | | | |
|---|---|---|---|
| 2,957,133 | 10/1960 | Burkhart et al. | 324—74 |
| 3,063,635 | 11/1962 | Gordon | 177—210 X |
| 3,192,535 | 6/1965 | Watson | 235—151.33 X |

S. CLEMENT SWISHER, *Primary Examiner.*

U.S. Cl. X.R.

177—211; 235—151.33